(12) United States Patent
Nishijima et al.

(10) Patent No.: US 6,406,061 B1
(45) Date of Patent: Jun. 18, 2002

(54) METHOD OF FOLDING AIR BAG BODY

(75) Inventors: Kazuyoshi Nishijima; Tetsuji Endo; Kazuhiro Kaneko; Toshiyuki Sugiyama; Yoshinori Goto; Masaki Ueno; Masahito Ishizuka; Mikio Ochiai, all of Fuji (JP)

(73) Assignee: Nihon Plast Co., Ltd, Shizuoka-Ker (JP)

( * ) Notice: Subject to any disclaimer, the term of this patent is extended or adjusted under 35 U.S.C. 154(b) by 0 days.

(21) Appl. No.: 09/817,610

(22) Filed: Mar. 26, 2001

(30) Foreign Application Priority Data

| Apr. 11, 2000 | (JP) | 2000-109606 |
| Aug. 31, 2000 | (JP) | 2000-264052 |
| Nov. 6, 2000 | (JP) | 2000-337938 |

(51) Int. Cl.$^7$ .............................................. B60R 21/24
(52) U.S. Cl. .................................... 280/743.1; 280/729
(58) Field of Search ......................... 280/728.1, 743.1, 280/729

(56) References Cited

U.S. PATENT DOCUMENTS

| 5,360,387 A | * | 11/1994 | Baker |
| 5,960,611 A | * | 10/1999 | Aigner et al. |
| 6,224,100 B1 | * | 5/2001 | Kamano et al. |
| 6,250,675 B1 | * | 6/2001 | Dietsch et al. |
| 6,250,676 B1 | * | 6/2001 | Werstat et al. |

FOREIGN PATENT DOCUMENTS

| DE | 44 40 845 | 5/1996 |
| JP | 2000-501354 | 12/1997 |
| JP | 10-129381 | 5/1998 |
| JP | 10-217894 | 8/1998 |
| JP | 11-59307 | 3/1999 |
| JP | 11-192909 | 7/1999 |
| WO | WO97/10124 | 3/1997 |
| WO | WO97/48580 | 12/1997 |

* cited by examiner

Primary Examiner—Avraham Lerner
(74) Attorney, Agent, or Firm—Kilpatrick Stockton LLP

(57) ABSTRACT

An air bag body (1) is expanded by charging an air therein after being expanded in a flat surface shape. Next, by gently gripping the air bag body (1) by upper and lower blades (26, 25) radially arranged in a radial direction of the air bag body (1), a height in a radial direction of the air bag body (1) is linearly restricted along the upper and lower blades (26, 25). Next, a plurality of movable blocks (24) are forward moved toward a center of the air bag body (1), and upper and lower panels (12, 11) of the air bag body (1) are accumulated. At this time, the upper and lower panels (12, 11) of the air bag body (1) are folded in a state of being apart from each other so as to form a wave shape. Next, the air bag body (1) is rotated, a portion left in a tab shape is wound around a periphery, and a center protruding portion of the air bag body (1) is pressed from an upper side, whereby a front surface deploying portion (35) is formed. When supplying gas to the folded air bag body (1), the front surface deploying portion (35) rapidly deploys so as to break a cover (5) and the gas is smoothly supplied to a peripheral edge portion (14), whereby it is possible to smoothly and rapidly deploy the air bag body (1).

12 Claims, 9 Drawing Sheets

METHOD OF FOLDING AIR BAG BODY

BACKGROUND OF THE INVENTION

1. Field of the Invention

The present invention relates to a method of folding an air bag body.

2. Description of the Related Art

Conventionally, there has been known, for example, an air bag apparatus provided in a steering wheel of a motor vehicle. The air bag apparatus is provided with an air bag body formed in a flat bag shape, a cover covering the air bag body, an inflator injecting gas, and the like. Then, the air bag body is folded to be small in accordance with a certain method at unactivated state so as to be received inside the cover. At a time of detecting an impact of collision by a collision sensor, the air bag body is expanded by injecting the gas from the inflator. The cover is broken due to an expansion pressure of the air bag body and the air bag body is protruded, expanded and deployed to face the passenger, so that the impact of the collision to a passenger is reduced.

The air bag body has been conventionally folded along a straight line at a predetermined position from a state being expanded on a flat plate so as to be formed in a rectangular parallelepiped shape capable of being received in the cover. However, there is a problem that it is hard to mechanically produce the folded air bag body, a lot of labor is required and it is hard to improve the productivity.

In order to improve the above mentioned points, as a folding method suitable for the automation, for example, there has been known a structure shown in International Patent Publication Laid-Open No. WO97/48580. In particular, the air bag body is expanded by using a folding apparatus provided with a folding plate arranged so as to form a coaxial circle shape or a spiral shape in opposite to each other from upper and lower portions of the air bag body. The air bag body is folded by gripping the air bag body by the folding plates, moving or deforming the folding plates toward predetermined hollow space so as to reduce distance between each of adjacent folding plates. However, in this structure, there is a problem that the structure of the apparatus becomes complex and it is not easy to reduce the production cost.

Further, with respect to, for example, the air bag body formed in a flat circular shape, there has been proposed a so-called petal fold in which the air bag body is collected toward a center from an outer peripheral portion thereof so as to form a pleat shape. With respect to this method, there have been known structures described in Japanese Patent Publication Laid-Open Nos. 10-129381, 10-217894 and the like.

At present, there is required a structure of an air bag body which can improve the deploying characteristic and reduce the production cost.

SUMMARY OF THE INVENTION

The present invention is made by taking the points mentioned above into consideration, and an object of the present invention is to provide a method of folding the air bag body in which the deploying characteristic is improved and the production cost can be reduced.

The first aspect of the invention provides a method of folding an air bag body having a first surface portion with an inlet port through which gas is introduced into the air bag body and a second surface portion opposing to the first surface portion, the method comprising the steps of: restricting the first surface portion and the second surface portion to be close to each other along a plurality of lines toward the inlet port; expanding the air bag body so that at least a part of one surface portion of the first and second surface portions other than the portion which is restricted, whereby putting the part of the first surface portion and the second surface portion away from the other; accumulating a portion between the portions restricted along the lines toward the inlet port; and pressing the portion restricted along the line against an outer periphery of the accumulated portion.

According to the first aspect of the invention, the air bag body is restricted in the state that the first surface portion and the second surface portion are close to each other along the line toward the inlet port. The other portions than the restricted portion are expanded without being restricted, whereby the first surface portion and the second surface portion are moved apart from each other. In this state, the first surface portion and the second surface portion are respectively folded in a wave shape without being engaged with each other by pressing and accumulating the portion between the lines, that is, the first surface portion ant the second surface portion toward the inlet port. Further, the portion restricted in the state of being close to each other is pressed against the outer periphery of the accumulated portion. In the air bag body folded in the manner mentioned above, the gas introduced from the inlet port is smoothly supplied to the peripheral edge portion, and it is easy to improve the deploying characteristic. Further, in the air bag body, a height in a front surface of the air bag body is not restricted at a time of accumulating. Accordingly, a large member needed at a time of restricting the height of the front surface is not required, and it is possible to rapidly perform the folding operation by the apparatus having a simple structure, and the production cost can be reduced.

The second aspect of the invention provides a method of folding an air bag body having a first surface portion with an inlet port through which gas is introduced into the air bag body and a second surface portion opposing to the first surface portion, the method comprising the steps of: expanding the air bag body, whereby putting the first surface portion and the second surface portion away from each other; restricting the first surface portion and the second surface portion to be close to each other along a plurality of lines toward the inlet port; accumulating a portion between the portions restricted along the lines toward the inlet port; and pressing the portion restricted along the line against an outer periphery of the accumulated portion.

The third aspect of the invention provides a method of folding an air bag body according to aforementioned aspects of the invention, further comprising the steps of; displacing the second surface portion facing the inlet port toward the first surface portion; and gathering the second surface portion facing the inlet port toward the first surface portion to form a forefront deploying portion, wherein restricting force applied to the air bag body is reduced before the pressing step is completed, wherein the air bag body is formed as an asterisk shape after the accumulating step is completed, and wherein the air bag body comprising the first and second surface portions formed as circular shape and the inlet port located at a central portion of the first surface portion.

DETAILED DESCRIPTION OF THE PREFERRED EMBODIMENTS

A description will be given by following embodiments of a method of folding an air bag body in accordance with the present invention with reference to the accompanying drawings.

Figure 1A:
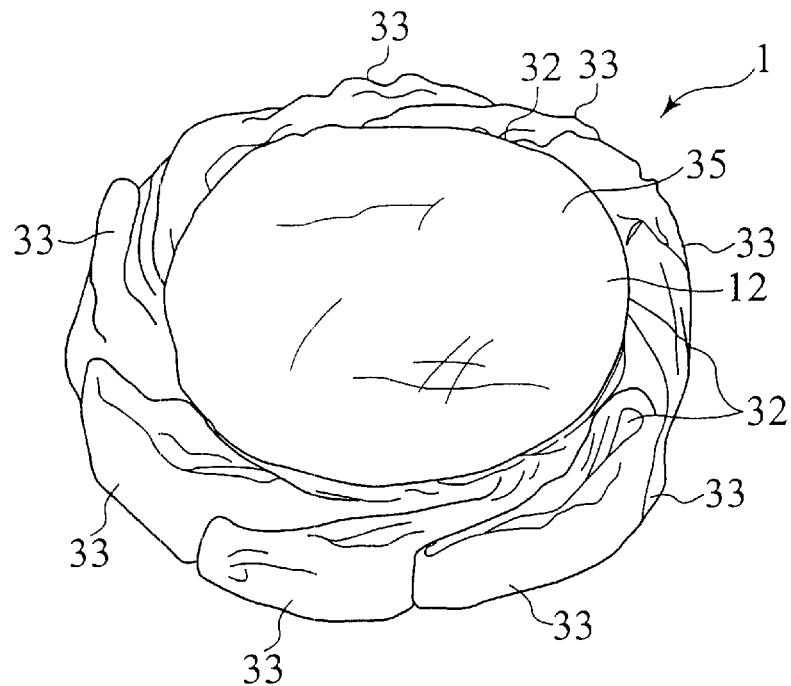
FIG. 1A is a perspective view showing one embodiment of an air bag body in accordance with the present invention, and shows a folded state of the air bag body.
Figure 1B:
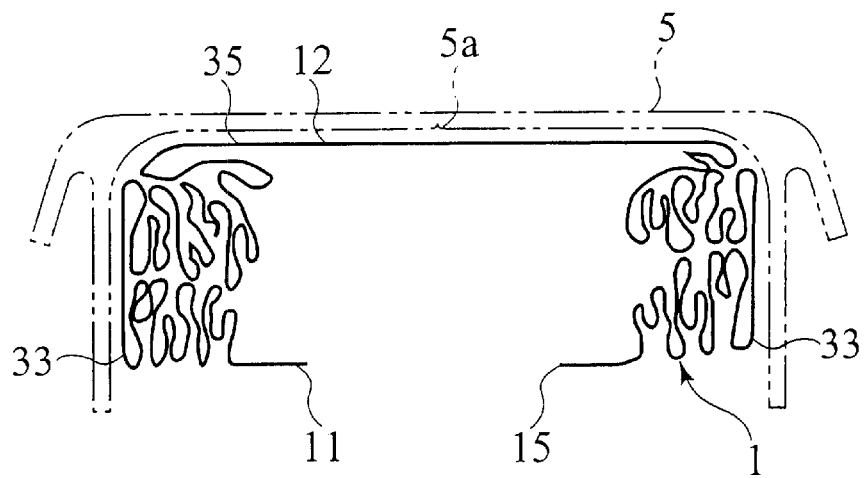
FIG. 1B is a cross sectional view showing a state of combining a cover with the air bag body.
Figure 2:
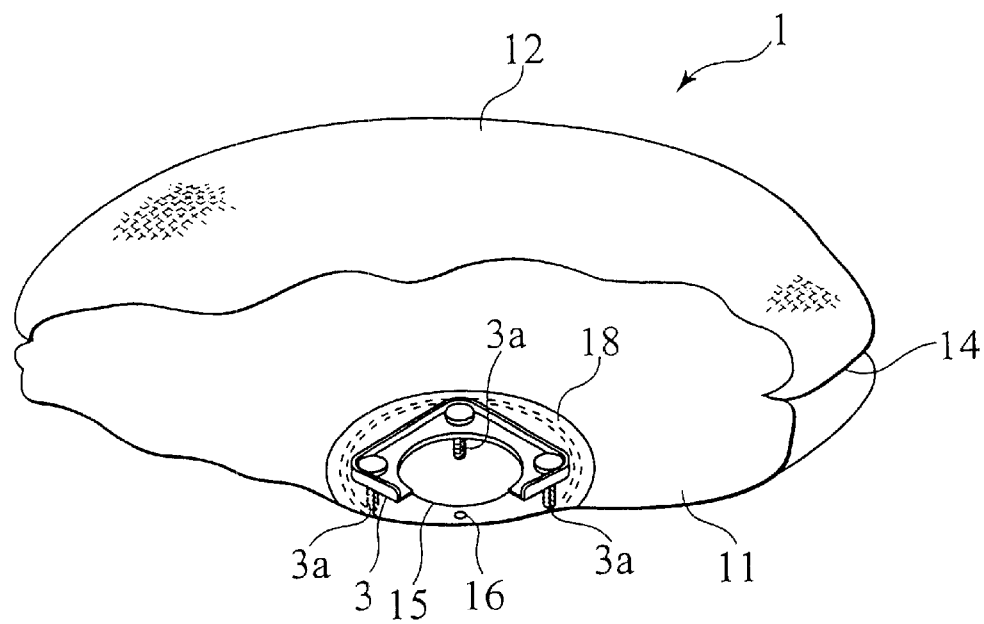
FIG. 2 is a partially cutaway view in perspective showing a state of combining a retainer with the air bag body.

In FIGS. 1A, 1B and 2, an air bag body 1 is assembled in an air bag apparatus corresponding to an occupant restraint apparatus provided in a boss portion of a steering wheel of a motor vehicle. The air bag apparatus is also called as an air bag module, and is constituted by a retainer 3 formed in a substantially ring shape and provided with a stud bolt 3a in a protruding manner, a base plate corresponding to a member to be mounted, a breakable cover 5 made of a synthetic resin or the like, an inflator injecting gas and the like in addition to the air bag body 1 (some of the constituting members are not illustrated). A description will be given below by setting a center side to which the air bag body is protruded, namely, a side of a passenger that is a subject to be protected to an upper side, a front side or a front surface side, and setting a side of a vehicle body, that is, a side of a steering shaft to a lower side, a rear surface side or a back surface side. Further, the air bag apparatus protects the passenger from an impact of collision by injecting the gas from the inflator, expanding the air bag body 1 received in a folding manner, breaking the cover 5 along a predetermined tear-line due to an expansion pressure of the air bag body 1 so as to protrude the air bag body 1, and widely deploying the air bag body 1 in front of the passenger.

As shown in FIG. 2, the air bag body 1 is formed in a flat bag shape by sewing two circular base fabrics having substantially the same shape. That is, the air bag body 1 is formed by overlapping a lower panel (a lower base fabric panel) 11 provided with a gas introduction surface corresponding to a first surface portion and an upper panel (an upper base fabric panel) 12 corresponding to a surface opposing to the gas introduction surface corresponding to a second surface portion, sewing a peripheral edge portion 14 and making it inside out through an inlet port 15 for inserting the inflator, the inlet port 15 having a circular hole shape and formed in a center of the lower panel 11. The diameter of a hole in a center of the retainer 3 is substantially equal to that of the hole of the inlet port 15. Further, a plurality of mounting holes 16 into which the stud bolts 3a are inserted are formed on the lower panel 11 at positions around the inlet port 15 corresponding to a gas introduction port through which the gas is introduced by the inflator. A part of the lower panel 11 around the inlet port 15 is reinforced by an annular reinforcing fabric 18. Single or a plurality of vent-hole (not shown) for ventilating the gas introduced by the inflator is formed on the lower panel 11. In the present embodiment, each of the panels 11 and 12 is formed by a so-called "non-coat" base fabric having a diameter of 650 mm, using a yarn of 66-nylon and 315 denier with 200 g/m2 and having no elastomer coatings, for example.

Figure 6:
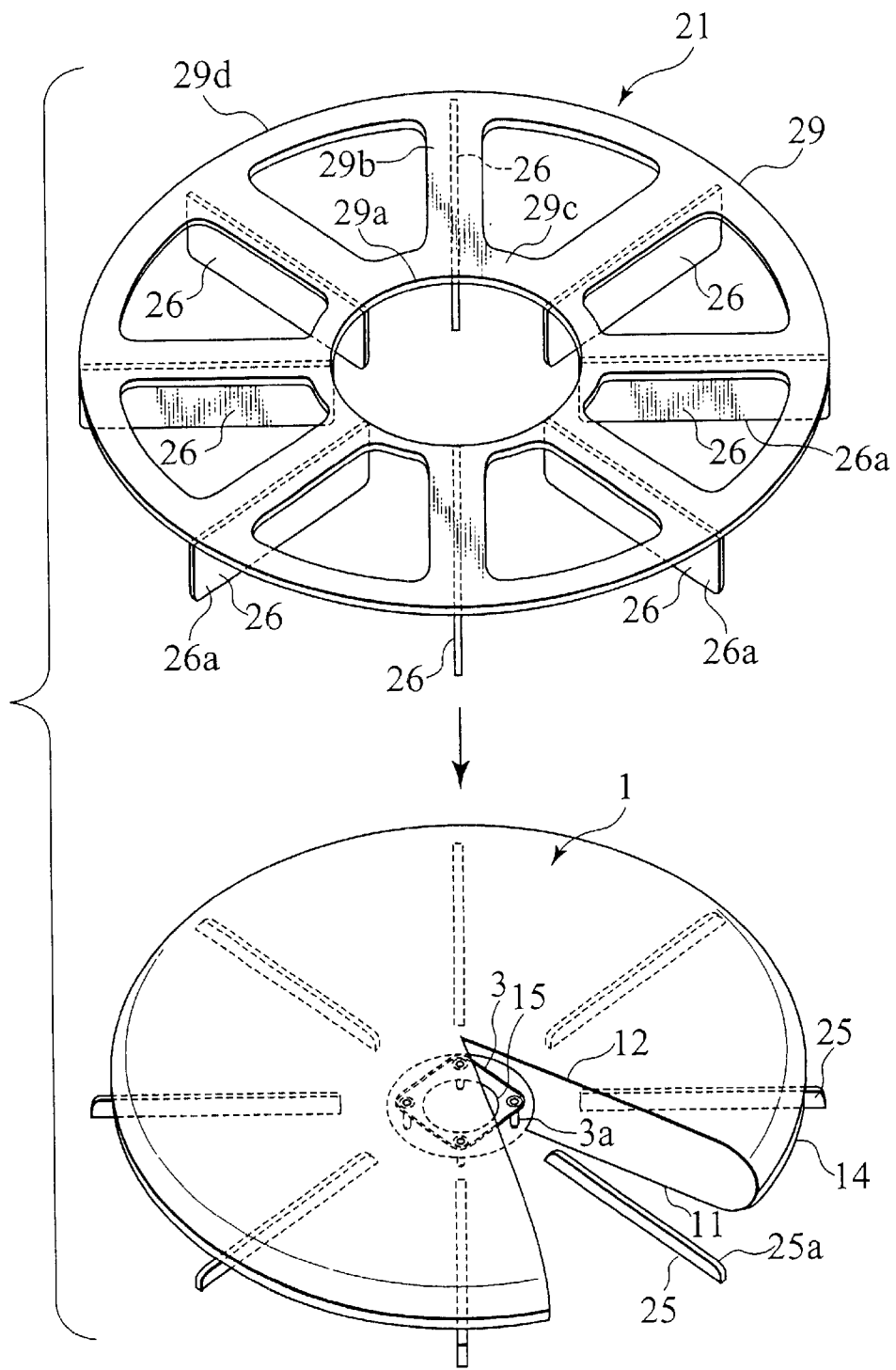
FIG. 6 is a perspective view showing a folding step of the air bag body subsequent to FIG. 5.
Figure 7:
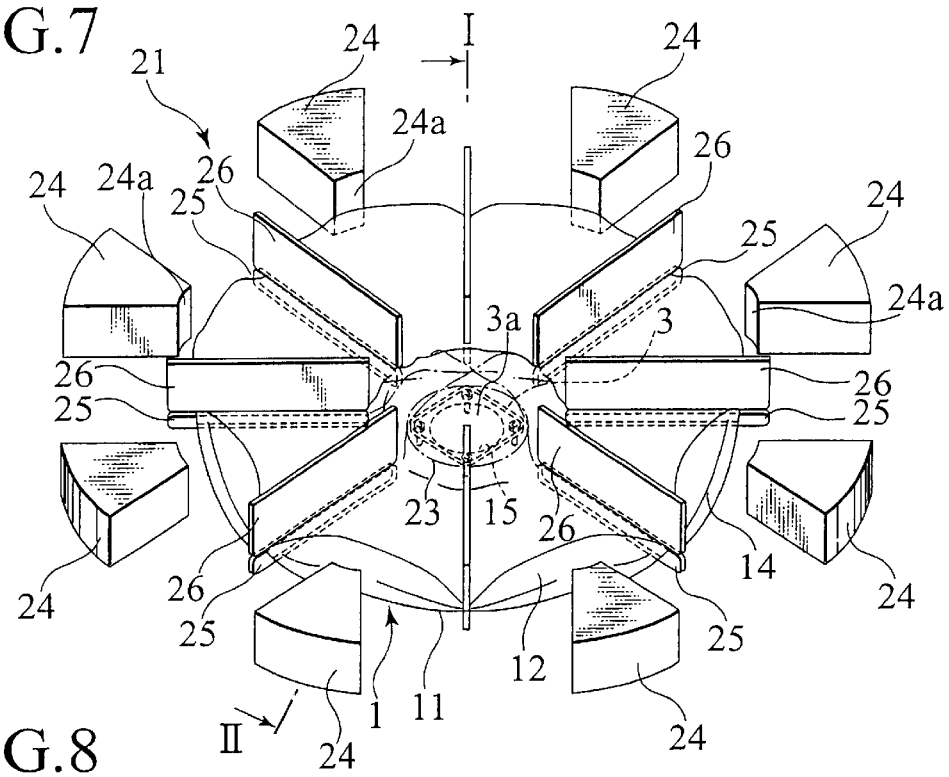
FIG. 7 is a perspective view showing a folding step of the air bag body subsequent to FIG. 6.
Figure 13:
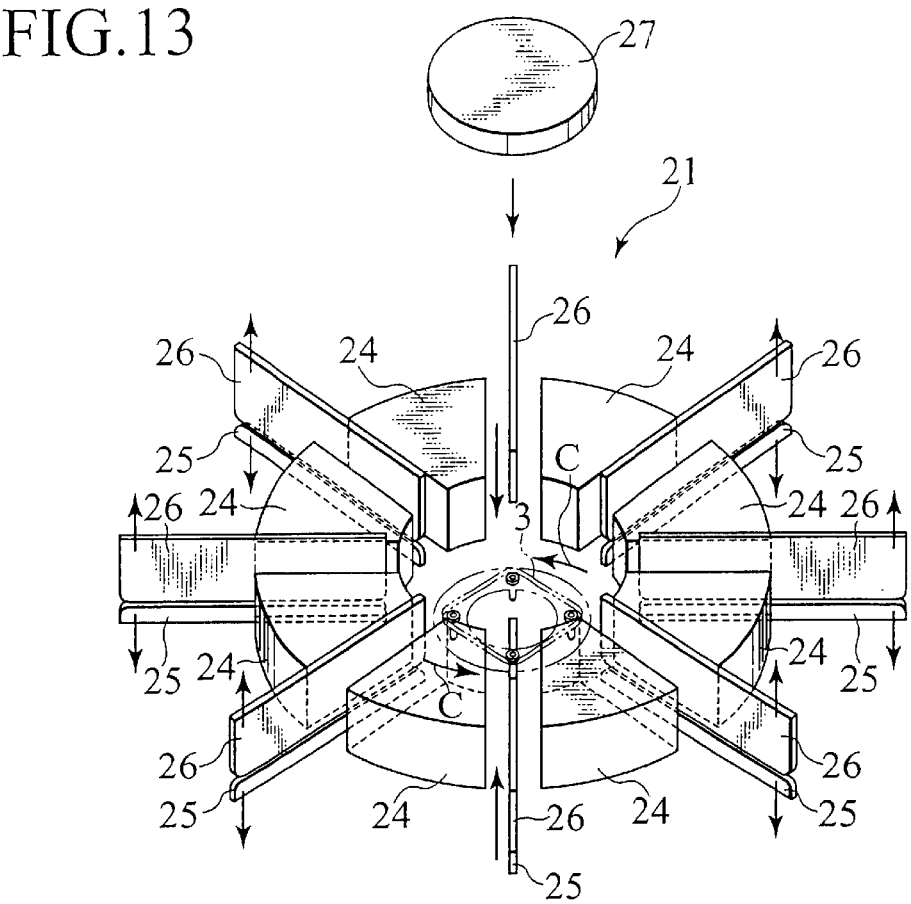
FIG. 13 is a perspective view showing a folding step of the air bag body subsequent to FIG. 10.
Figure 14:
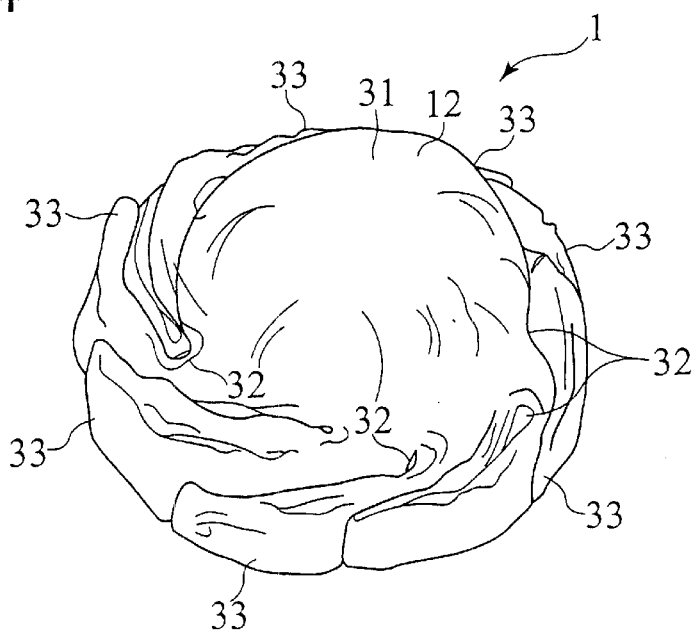
FIG. 14 is a perspective view schematically showing an outer appearance of the air bag body in FIG. 13.

As shown in FIGS. 6, 7 and 13, the folding apparatus 21 is constituted by a table 22, a center block 23 corresponding to expanding means and pressing means, a plurality of movable blocks 24 corresponding to accumulating means, a lower blade 25 and an upper blade 26 corresponding to a guide member, a center plate 27 corresponding to displacing means, control means (not shown) controlling these elements, an electric power source apparatus, a drive source and the like.

Figure 3:
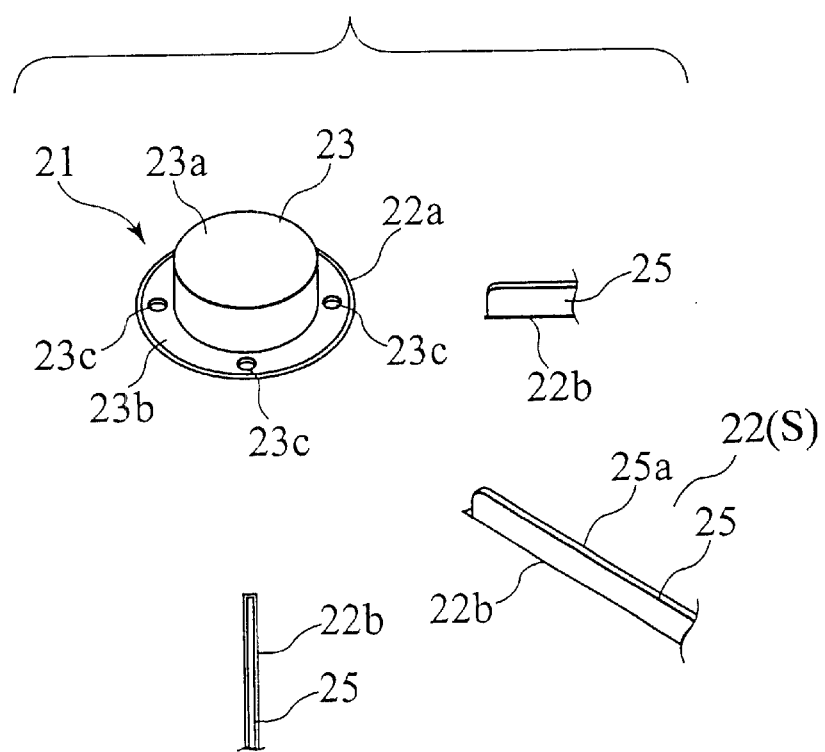
FIG. 3 is a perspective view of a part of a folding apparatus of the air bag body.

The table 22 is provided with a substantially flat plate surface (hereinafter, the plate surface of the table 22 is referred as a reference surface S) on an upper surface thereof, and as shown in FIG. 3, a center block 23 is placed in a circular hole 22a provided in a center portion of the plate surface. The center block 23 is provided with a circular column portion 23a having a shape similar to the inflator and a peripheral edge portion 23b surrounding the circular column portion 23a and coaxially provided at a position lower than the circular column portion 23a. Further, the center block 23 is structured such that a rotating mechanism rotating at an optionally set angle up to about. 90 degrees and a vertically moving mechanism vertically moving at an optionally set stroke up to about 160 mm are combined. An air nozzle (not shown) injecting the air is installed in the center block 23. Holding portions 23c each having a circular hole shape and capable of inserting the stud bolt 3a of the retainer 3 so as to fix are formed in the peripheral edge portion 23b at a predetermined interval. In this case, in the respective drawings, for explanation purpose, the table 22 and the center block 23 are omitted.

As shown in FIG. 3, a plurality of slit portions 22b are radially formed around the circular hole 22a on the table 22, and a lower blade 25 having a flat plate shape and being vertical to the reference surface S is provided in each of the slit portions 22b in such a manner as to move forward and backward in a vertical direction, more particularly, in such a manner as to move from the plate surface of the table 22 to a predetermined height. Further, a guide portion 25a parallel to the reference surface S is provided in each of the lower blades 25 along an upper end edge portion. An end portion of the guide portion 25a, that is, a corner portion between an inner peripheral side and an outer peripheral side of each of the lower blades 25 is formed in a smooth curved surface.

As shown in FIG. 7 for example, movable blocks 24 are respectively provided at a position between the lower blades 25. Each of the movable blocks 24 is connected to driving means arranged under the table 22 via a slit (not shown) provided on the table 22, and is guided and driven so as to move forward and backward from the peripheral edge portion of the table 22 to a portion near the center block 23, that is, each of the movable blocks can be collected and distributed. Further, each of the movable blocks 24 is formed in a substantially fan shape in plan, and a pressing portion 24a is provided in an end portion in the inner peripheral side thereof opposing to the center block 23, for example, in a curved surface shape.

A plurality of upper blade 26 are radially mounted on a lower surface of an upper plate 29 provided above the table 22 as shown in FIG. 6, and are moved and driven forward and backward in a vertical direction together with the upper plate 29. Further, each of the upper blades 26 is arranged so as to oppose to the lower blade 25, a pair of corresponding upper and lower blades 26 and 25 have an opposing line at the end edges. A pair of upper and lower blades 26 and 25 are alternately arranged with the movable block 24 in a circumferential direction. The upper blade 26 has a plate shape, which is similar to the lower blade 25, vertical to the reference surface S, and an end portion, that is, a corner portion thereof has a smooth curved surface shape. Further, a guide portion 26a parallel to the guide portion 25a of the lower blade 25 is formed in the upper blade 26 so as to oppose to the guide portion 25a. A length of each of the upper blades 26 is substantially the same as that of the lower blade 25, however, a height thereof is formed to be larger than that of the lower blade 25. The upper plate 29 is provided with support portions 29b supporting each of the upper blades 26 and arranged so as to form a radial shape in plan, an inner peripheral side connecting portion 29c connecting end portions in an inner peripheral side of the support portions 29b to each other, and an outer peripheral side connecting portion 29d connecting end portions in an outer peripheral side of the support portions 29b to each other.

In this case, an emboss work is applied to end portions 26a and 25a at which the upper and lower blades 26 and 25 are linearly in contact with the air bag body 1, or an elastomer tape or the like is adhered thereto, whereby these portions are slidably contact with the air bag body 1 with a suitable sliding resistance.

In accordance with the present embodiment, eight movable blocks 24 and eight pairs of upper and lower blades 26 and 25 corresponding thereto are provided. In the case of the structure which does not cover the above of the inlet port 15 of the air bag body 1, the number of these elements can be suitably selected with taking a capacity of the air bag body 1 and a shape of a space in which the air bag body 1 is received.

Further, a circular hole 29a is pierced in the center portion of the upper plate 29, and a disc-like center plate 27 (refer to FIG. 13) having substantially the same diameter as that of the circular hole 29a and vertically driven independent from the upper plate 29 is arranged within the circular hole 29a.

Next, a description will be given of a folding step of the air bag body 1 with reference to FIGS. 1A to 16. In this case, in FIGS. 3 to 6, the movable block 24 is omitted.

Figure 4:
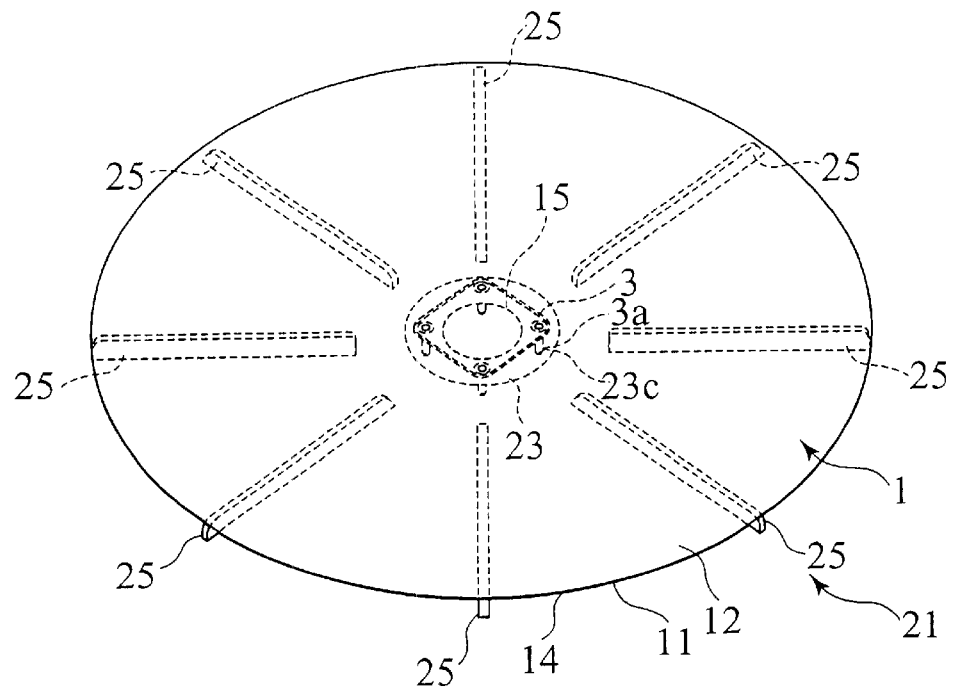
FIG. 4 is a perspective view showing a folding step of the air bag body.

In an initial state, the center block 23 is arranged so that a back surface of the peripheral edge portion 23b is connected parallel to a front surface of the table 22, as shown in FIG. 3. Further, the lower blade 25 is retracted downward from the back surface of the table 22, the upper blade 26 and the center plate 27 are retracted upward and the movable block 24 is retracted to the outer peripheral side. On the contrary, with respect to the air bag body 1, as shown in FIG. 2, the retainer 3 is previously inserted into an inner portion of the air bag body 1 from the inlet port and the stud bolt 3a is taken out from the mounting hole 16, as shown in FIG. 2. After the above mentioned state, the air bag body 1 is expanded on the table 22 so as to form a flat plate and set in a stationary manner, as shown in FIG. 4, and the circular column portion 23a of the center block 23 is inserted into the inlet port 15. Further, each of the stud bolts 3a is inserted to the holding portion 23c and is fixed by a lock mechanism (not shown) provided in the holding portion 23c.

Figure 5:
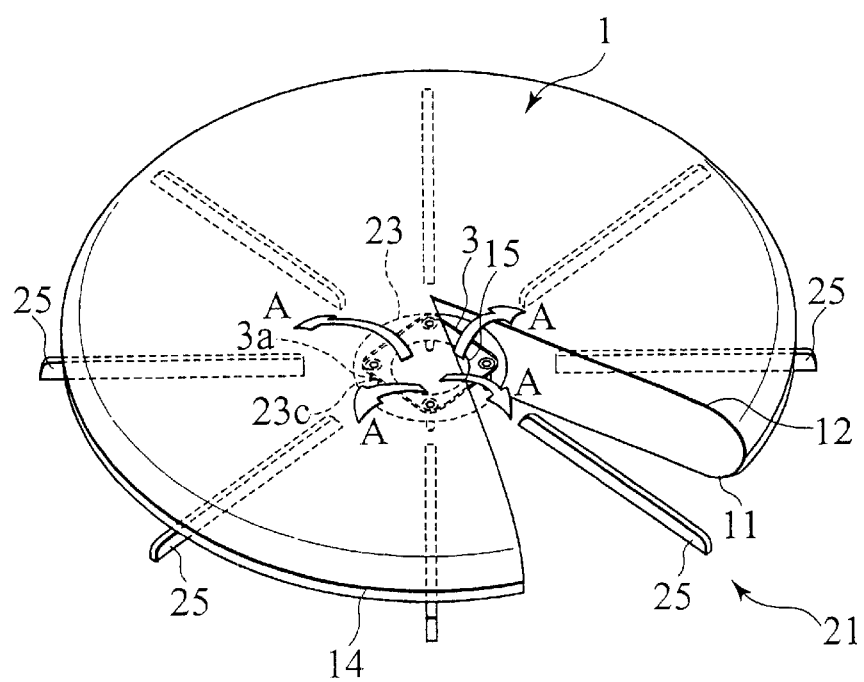
FIG. 5 is a perspective view showing a folding step of the air bag body subsequent to FIG. 4.

Next, as shown in FIG. 5, as an expanding step in the restricting and expanding step, a compressed air is bled into the air bag body 1 from an air nozzle, as shown by an arrow A, provided in the circular column portion 23a of the center block 23 so as to form the air bag body 1 in an flat cushion shape. Here, in this state, the air bag body 1 is in a state of being expanded so as to be softer than a hardness of the air bag body 1 in a complete expanding state such as the state at a time of deploying the air bag body 1.

Figure 8:
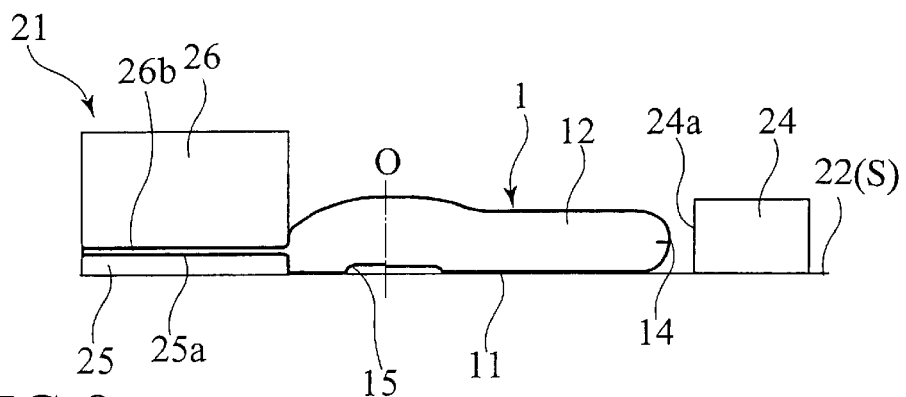
FIG. 8 is a cross sectional view along a line I-O-II in FIG. 7.

Next, as shown in FIG. 6, as a restricting step in the restricting and expanding step, as well as the lower blade 25 is ascended and protruded upward from the surface of the table 22, the upper blade 25 is descended so as to be brought into contact with the air bag body 1. Further, as shown in FIGS. 7 and 8, the air bag body 1 is held between the lower blade 25 and the upper blade 26 so as to be radially depressed. In this state, a predetermined interval is set between the guide portions in the upper and lower blades 26 and 25, and the air bag body 1 is partly restricted in the height direction, and is slidable in the radial direction. After this state, when increasing the internal pressure of the air bag body 1, the upper blade 26 which contacts with the expanding air bag body 1 protrudes upward so as to move the upper and lower panels 12 and 11 apart from each other, however, the upper plate 29 is kept at a height at which the upper panel 12 of the air bag body 1 is not in contact therewith.

Figure 9:
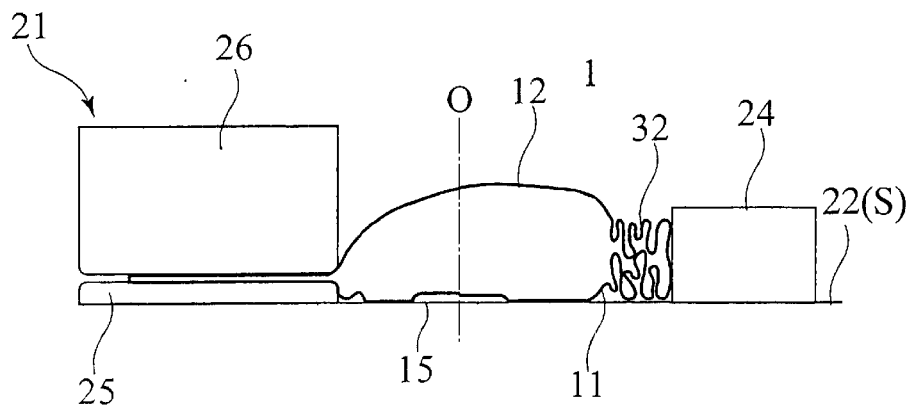
FIG. 9 is a cross sectional view showing a folding step of the air bag body subsequent to FIG. 8.
Figure 10:
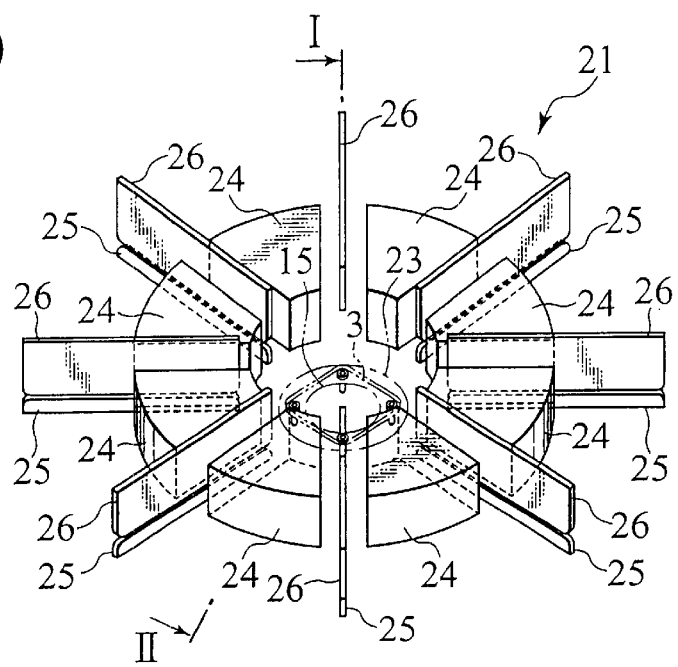
FIG. 10 is a perspective view showing a folding step of the air bag body subsequent to FIG. 7.
Figure 11:
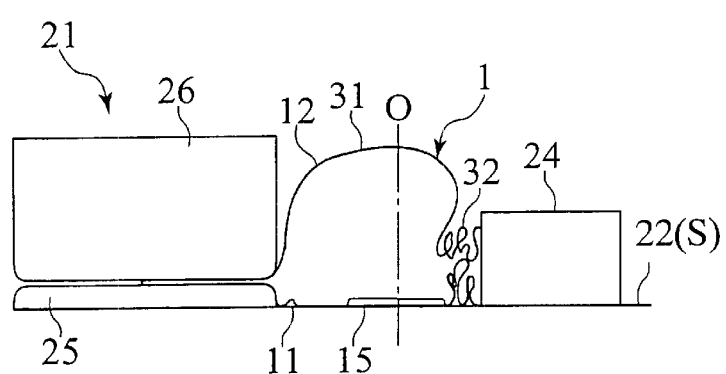
FIG. 11 is a cross sectional view along a line I-O-II in FIG. 10.
Figure 12:
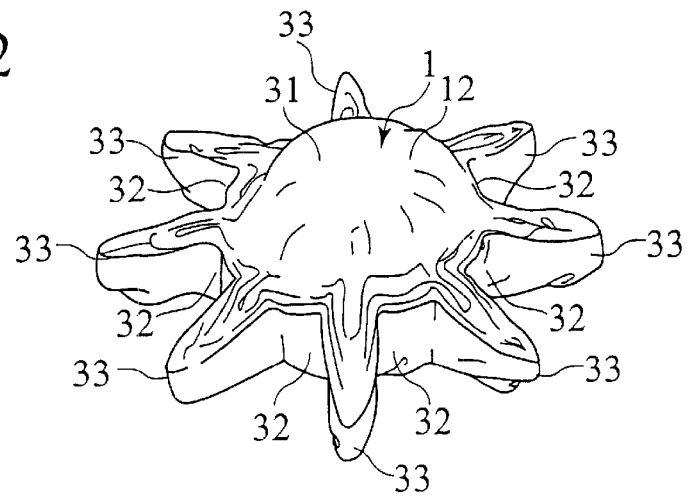
FIG. 12 is a perspective view schematically showing an outer appearance of the air bag body in FIG. 10.

Next, as an accumulating step, each of the movable blocks 24 is interlocked and is moved forward so as to be gathered toward the center point O at the same time. Each of the blocks 24 moves to the forward movement limit shown in FIGS. 10 and 11 via an intermediate state shown in FIG. 9. In FIG. 9 schematically showing the air bag body 1 in the middle step of the folding, the air bag body 1 is structured such that the upper and lower panels 12 and 11 are folded so as to form a wave shape without substantially engaging with each other, that is, in a so-called "estranged" from each other in the portion pressed by the movable block 24, and an expanding portion 31 protruding so as to form a dome shape is formed in the center. A plurality of wave-like recess portions 32 are formed in the periphery of the expanding portion 31. A plurality of tab portions 33 are formed in a portion gripped between the upper and lower blades 26 and 25. Accordingly, a whole shape of the air bag body 1 is formed in a substantially asterisk shape. In this case, in accordance with the forward movement of each of the movable blocks 24, each of the tab portions 33 slides toward the center portion through the portion between the blades 26 and 25 together with the wave-like recess portion 32 corresponding to the accumulated portion, so that the expanding portion 31 tends to be further protruded.

Next, as shown in FIG. 13, as a restriction reducing step, the upper blade 26 is set at the current position, and the lower blade 25 is retracted slightly downward or wholly. Accordingly, it is possible to weaken or do away with the force gripping the linearly guided tab portion 33 of the upper and lower panels 12 and 11, and is possible to keep the shape of the air bag body 1 by the center plate 27 and the movable block 24. In this case, in the restriction reducing step, it may be adopted to move the upper blade 26 upward at a slight amount.

Next, as shown in FIG. 13, as a pressing step, the center block 23 holding the center portion of the air bag body 1 is rotated in a direction shown by an arrow C at a predetermined angle. Together with this rotation, the tab portion 33 is taken into the pressing portion 24a side of the movable block 24, and is arranged along the outer periphery portion of the wave-like recess portion 32 so as to form a spiral shape. The tab portion 33 is arranged therealong without being deformed upward by the upper blade 26, and the shape of the folded air bag body 1 is arranged at a predetermined height.

Figure 15:
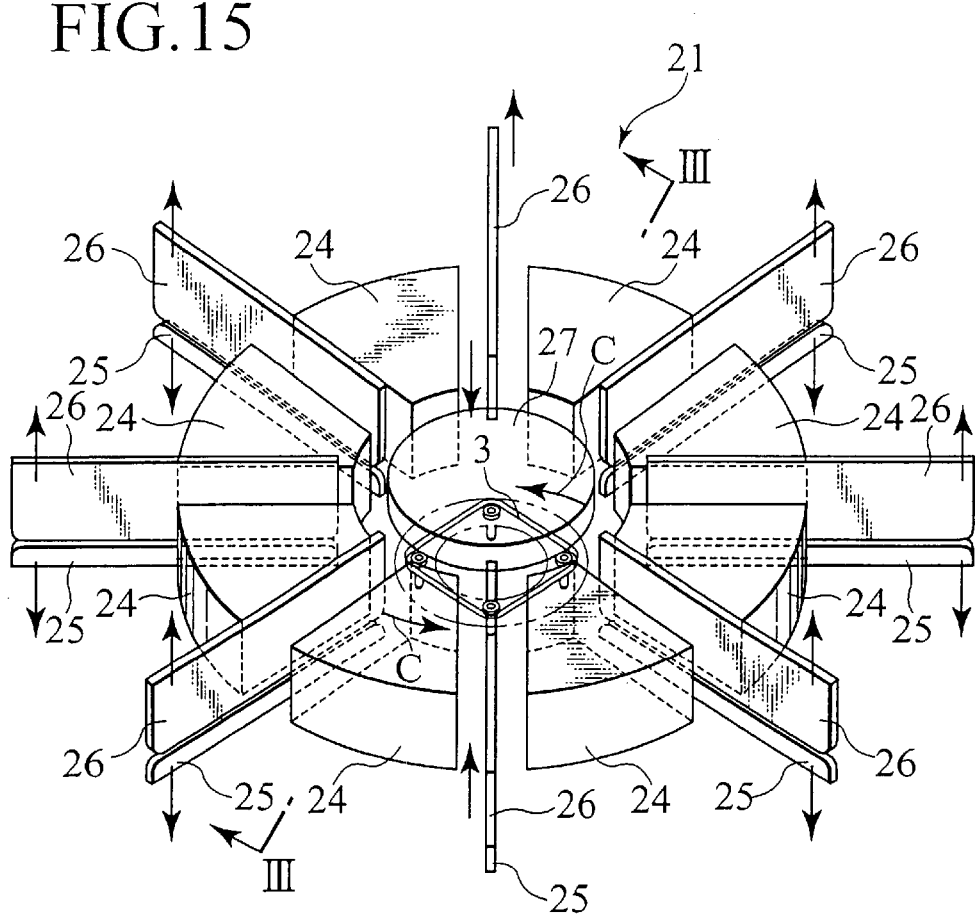
FIG. 15 is a perspective view showing a folding step of the air bag body subsequent to FIG. 13.
Figure 16:
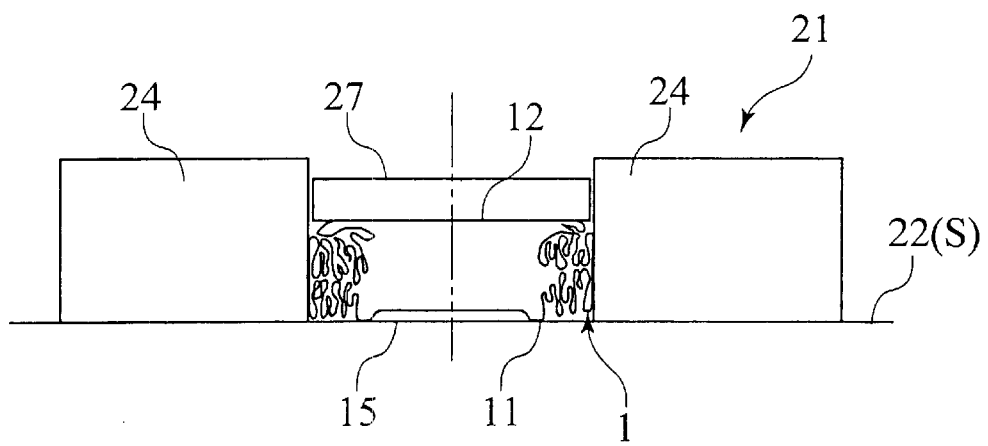
FIG. 16 is a cross sectional view along a line III—III in FIG. 15.

As a displacing step after the accumulating step, the center plate 27 is descended. As shown in FIGS. 15 and 16, the expanding portion 31 expanding above the air bag body 1 is pressed down and accumulated so as to form in a flat shape. A front surface deploying portion 35 not engaging with the other portions is formed by covering the expanding portion 31 formed in a flat shape over the folded portion of the air bag body 1, and is restricted to a height corresponding to a predetermined receiving size. After this state, as shown in FIG. 1A, the air bag body 1 is folded in a predetermined shape having a substantially petal shape, and the shape of the air bag body 1 is arranged in a column shape of a substantially regular octagon in plan view having a predetermined height.

When the air bag body 1 folded in the manner mentioned above is assembled in the air bag apparatus, the inflator is operated and the gas is supplied from the inlet port 15 of the air bag body 1, at first the front surface deploying portion 35 positioned immediately above the inlet port 15 is rapidly deployed to the front surface side, and breaks the cover 5 so as to form the protruding port.

Next, the upper and lower panels 12 and 11 are easily moved apart from each other, and the tab portion 33 arranged along the outer periphery of the wave-like recess portion 32 in the folding final step is pressed to the outer peripheral side, whereby the air bag body 1 can be rapidly deployed. Further, the supplied gas is smoothly supplied along the portion restricted by upper and lower blades 26 and 25 linearly opposing to each other to the end portion of the tab portion 33, and the tab portion 33 is deployed so as to be rewound, whereby it is possible to easily improve the deploying characteristic.

In the folding apparatus 21 in accordance with the present embodiment, the portion corresponding to the upper blade 26 in the upper panel 12 of the air bag body 1 is linearly guided by the upper blade 26 along a track accumulated by the movable block 24. The structure is made such that the other portion than the portion corresponding to the upper blade 26 in the upper panel 12 can freely protrude without being restricted in height. Since the whole surface of the upper panel 12 is restricted in height, the structure of the air bag body 1 can be made simple, and it is possible to sufficiently move the upper and lower panels 12 and 11 apart from each other at a time of expansion. Further, in the state that the air bag body 1 is folded, it is possible to make the upper and lower panels 12 and 11 not be engaged substantially with each other from the inlet port 15 to the peripheral edge portion 14.

Since the upper and lower blades 26 and 25 are retracted and the center block 23 is rotated after the accumulating step of moving forward each of the movable blocks 24, it is possible to reduce the force applied to the upper and lower panels 12 and 11 and it is possible to smoothly fold the air bag body 1.

Since the front surface deploying portion 35 provided in the center front surface of the air bag body 1 deploys at the beginning so as to rapidly break the cover 5, it is possible to effectively utilize the pressure of the gas injected from the inflator so as to intend to rapidly deploy the air bag body 1, and it is possible to intend to make the air bag apparatus compact. Since it is possible to reduce the primary peak pressure of the injection gas, it is possible to increase the secondary peak pressure of the injection gas and it is possible to effectively utilize the gas pressure of the inflator. At a time of deploying the air bag body 1, the air bag body 1 is deployed so that the expanding portion 31 can be reformed due to the gas pressure from the front surface deploying portion 35, and the front surface deploying portion 35 can smoothly break the cover 5 formed by using a soft resin or the like. Further, it is possible to easily adjust the passenger restraining characteristic by reducing the internal pressure (the primary pressure), reducing the impact and deploying in the peripheral direction, in accordance with the deployment of the front surface deploying portion 35.

As mentioned above, in accordance with the air bag body 1 and the air bag apparatus using the air bag body 1 of the present embodiment, it is possible to rapidly deploy and it is possible to easily improve the deploying characteristic. Further, in accordance with the method of folding the air bag body 1 suitable for automation and the folding apparatus 21 to which the method of folding the air bag body 1 is applied of the present embodiment, it is possible to reduce the production cost of the air bag body having the improved deploying characteristic and it is possible to inexpensively provide the air bag body.

In accordance with the embodiment mentioned above, with respect to each of the lower blade 25 and each of the upper blades 26, the guide portions 25a and 26a parallel to each other are provided, however, it is possible to change the shape of the guide portion so as to intend to smoothly guide the air bag body 1 in the folding step.

Figure 17:
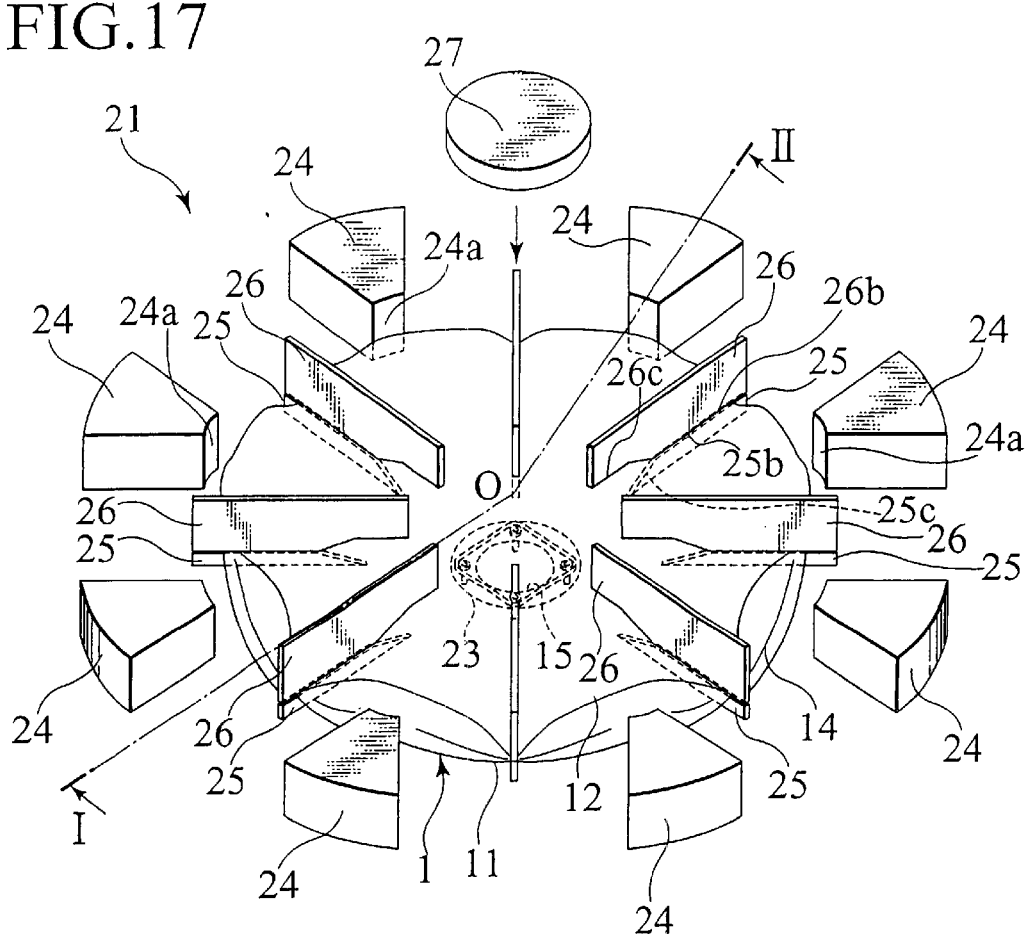
FIG. 17 is a perspective view showing another embodiment of an air bag body in accordance with the present invention.
Figure 18:
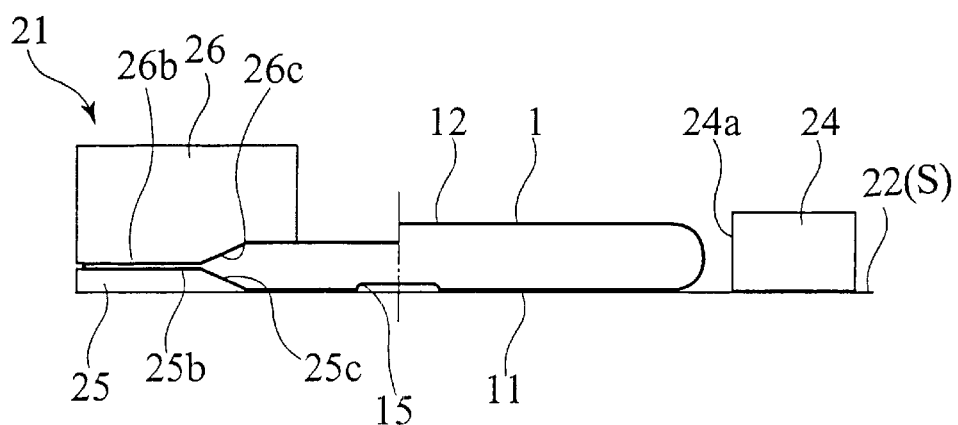
FIG. 18 is a cross sectional view along a line I-O-II in FIG. 17.

For example, as in a folding apparatus 21 shown in FIGS. 17 and 18, with respect to the lower blade 25, there are provided with a first guide portion 25b in which an upper end edge portion thereof is parallel to the table 22 front surface, and a second guide portion 25c descending from an inner peripheral side end portion of the first guide portion 25b toward an inner peripheral side so as to form an inclined surface. On the contrary, with respect to the upper blade 26 having a height wholly larger than that of the lower blade 25, there are formed a first guide portion 26b opposing to the first guide portion 25b of the lower blade 25 and being parallel to the first guide portion 25b, and a parallel second guide portion 26c opposing to the second guide portion 25c of the lower blade 25. Further, in the second guide portion 26c, a surface parallel to the surface of the table 22 is provided in continuous with the inclined surface inclined toward the upper side, and is arranged so as to protrude to an inner peripheral side from the lower blade 25. In this case, to the first guide portions 26b and 25b and the second guide portions 26c and 25c corresponding to end portions at which the upper and lower blades 26 and 25 are linearly in contact with the air bag body 1, an emboss work is applied or an elastomer tape or the like is adhered, whereby it is set that they are slidably in contact with the air bag body 1 with the proper sliding resistance.

In each of the embodiments mentioned above, after the accumulating step of forward moving each of the movable blocks 24 and the pressing step of rotating the center block, the displacing step of descending the center plate is executed. On the contrary, the structure can be made such that after the accumulating step of forward moving each of the movable blocks 24, the displacing step of descending the center plate is executed so as to form one upper panel 12 in a substantially flat surface shape at the portion opposing to the inlet port 15 of the lower panel 11 and next, the pressing step of rotating the center block 23 is executed, thereby folding the air bag body 1. In this structure, the upper panel 12 is arranged by one sheet in a substantially flat surface shape without being folded, at the portion opposing to the inlet port 15 of the lower panel 11. Accordingly, the gas introduced from the inlet port 15 is smoothly supplied to the outer peripheral side from the portion near the inlet port 15, and it is possible to intend to smoothly deploy the folded wave-like recess portion 32 and the tab portion 33 toward the outer peripheral side.

Further, in each of the embodiments mentioned above, in the restricting and expanding step, the height of the air bag body 1 is restricted by the upper and lower blades 26 and 25 after expanding the air bag body 1. In addition to the structure mentioned above, it is possible to employ an operating step of expanding the air bag body 1 after restricting the height of the air bag body 1 by the upper and lower blades 26 and 25, and an operating step of restricting the height of the air bag body 1 by the upper and lower blades 26 and 25 while expanding the air bag body 1.

The present invention mentioned above can be applied to an air bag apparatus for a passenger in an assistant driver's seat provided in an instrument panel, an air bag apparatus for a side protection provided in a side portion of a seat or a door and a pillar of a vehicle body, an air bag apparatus for a rear passenger provided in a rear portion of the seat, the other air bag apparatuses for protecting a subject to be protected from an impact, and the like, in addition to the air bag body for the air bag apparatus provided in the steering wheel of the motor vehicle.

What is claimed is:

1. A method of folding an air bag body having a first surface portion with an inlet port through which gas is introduced into the air bag body and a second surface portion opposing to the first surface portion, the method comprising the step of:

restricting the first surface portion and the second surface portion to be close to each other, along a plurality of lines leading toward the gas inlet port;

inflating the air bag body so that the first and second surface portions other than the portions which are restricted to be close to each other are taken apart from each other at least at a part of one surface portion thereof;

accumulating a plurality of portions between the portions which are restricted to be close to each other toward the inlet port; and pressing the portions which are restricted to be close to each other against an outer periphery of the accumulated portions.

2. A method of folding an air bag body according to claim 1, further comprising the step of;

displacing the second surface portion facing the inlet port toward the first surface portion.

3. A method of folding an air bag body according to claim 1, wherein restricting force applied to the air bag body is reduced before the pressing step is completed.

4. A method of folding an air bag body according to claim 1, wherein the air bag body is formed as an asterisk shape after the accumulating step is completed.

5. A method of folding an air bag body according to claim 1, wherein said air bag body comprising the first and second surface portions is formed as a circular shape and the inlet port is located at a central portion of said first surface portion.

6. A method of folding an air bag body according to claim 1, further comprising the step of;

gathering the second surface portion facing the inlet port toward the first surface portion to form a forefront deploying portion.

7. A method of folding an air bag body having a first surface portion with an inlet port through which gas is introduced into the air bag body and a second surface portion opposing to the first surface portion, the method comprising the step of:

inflating the air bag body, so that the first surface portion and the second surface portion are taken apart from each other;

restricting the first surface portion and the second surface portion to be close to each other along a plurality of lines leading toward the inlet port;

accumulating a plurality of portions between the portions which are restricted to be close to each other toward the inlet port; and pressing the portions which are restricted to be close to each other against an outer periphery of the accumulated portions.

8. A method of folding an air bag body according to claim 7, further comprising the step of;

displacing the second surface portion facing the inlet port toward the first surface portion.

9. A method of folding an air bag body according to claim 7, wherein restricting force applied to the air bag body is reduced before the pressing step is completed.

10. A method of folding an air bag body according to claim 7, wherein the air bag body is formed as an asterisk shape after the accumulating step is completed.

11. A method of folding an air bag body according to claim 7, wherein said air bag body comprising the first and second surface portions is formed as a circular shape and the inlet port is located at a central portion of said first surface portion.

12. A method of folding an air bag body according to claim 7, further comprising the step of;

gathering the second surface portion facing the inlet port toward the first surface portion to form a forefront deploying portion.

* * * * *